US012612133B2

(12) United States Patent
Stegmaier et al.

(10) Patent No.: US 12,612,133 B2
(45) Date of Patent: Apr. 28, 2026

(54) METHOD FOR OPERATING A PUSHING AID FOR AN ELECTRIC BICYCLE

(71) Applicant: Robert Bosch GmbH, Stuttgart (DE)

(72) Inventors: Juergen Stegmaier, Wannweil (DE); Thomas Mattes, Eningen Unter Achalm (DE)

(73) Assignee: Robert Bosch GmbH, Stuttgart (DE)

( * ) Notice: Subject to any disclaimer, the term of this patent is extended or adjusted under 35 U.S.C. 154(b) by 57 days.

(21) Appl. No.: 18/732,983

(22) Filed: Jun. 4, 2024

(65) Prior Publication Data

US 2024/0400159 A1 Dec. 5, 2024

(30) Foreign Application Priority Data

Jun. 5, 2023 (DE) ..................... 10 2023 205 208.3

(51) Int. Cl.
B62M 25/08 (2006.01)
B62M 6/45 (2010.01)

(52) U.S. Cl.
CPC .............. B62M 25/08 (2013.01); B62M 6/45 (2013.01)

(58) Field of Classification Search
CPC ................................ B62M 25/08; B62M 6/45
See application file for complete search history.

(56) References Cited

U.S. PATENT DOCUMENTS

| | | | | |
|---|---|---|---|---|
| 2017/0151999 A1* | 6/2017 | Kinpara | ................. | B62K 21/26 |
| 2017/0349236 A1* | 12/2017 | Baumgaertner | ......... | B62M 6/70 |
| 2018/0086417 A1* | 3/2018 | Baumgaertner | ......... | B62M 6/55 |
| 2018/0118305 A1* | 5/2018 | Tsuchizawa | .......... | B62M 25/08 |
| 2021/0197924 A1* | 7/2021 | Higashi | .................. | B62J 45/412 |
| 2023/0150608 A1* | 5/2023 | Misgeld | .................. | B62M 6/60 |
| | | | | 180/206.1 |
| 2023/0294791 A1* | 9/2023 | Hahn | ..................... | B62M 9/123 |
| | | | | 701/22 |

FOREIGN PATENT DOCUMENTS

| | | |
|---|---|---|
| DE | 10 2020 215 222 B4 | 10/2022 |
| JP | 2003-95182 A | 4/2003 |
| JP | 2018-70000 A | 5/2018 |

* cited by examiner

*Primary Examiner* — Hunter B Lonsberry
*Assistant Examiner* — Harrison Heflin
(74) *Attorney, Agent, or Firm* — Maginot, Moore & Beck LLP

(57) ABSTRACT

A method for operating a pushing aid of an electric bicycle is disclosed. The electric bicycle includes a drive unit for generating a propulsion and a gearshift between the drive unit and a drive wheel of the electric bicycle. The gearshift is designed to be electronically operable. The method includes the following steps of which are carried out in a pushing aid mode of the electric bicycle (i) determining a current transmission ratio of the gearshift, (ii) operating the drive unit to generate a pushing aid motor torque, and (iii) controlled adjustment of the transmission ratio of the gearshift as a function of the determined current transmission ratio.

16 Claims, 2 Drawing Sheets

METHOD FOR OPERATING A PUSHING AID FOR AN ELECTRIC BICYCLE

This application claims priority under 35 U.S.C. § 119 to patent application no. DE 10 2023 205 208.3, filed on Jun. 5, 2023 in Germany, the disclosure of which is incorporated herein by reference in its entirety.

BACKGROUND

The present disclosure relates to a method for operating a pushing aid for an electric bicycle, and to an electric bicycle.

Electric bicycles with a pushing aid function are well known. For example, when the rider of the electric bicycle presses a button, a motor torque is generated by the drive unit of the electric bicycle to assist the rider in pushing. If the drive concept is a mid-motor, i.e. if the drive unit is located on the bottom bracket of the electric bicycle, the generated pushing aid motor torque is transmitted to the rear wheel of the electric bicycle via the other drive train. This means that the propulsive torque of the pushing aid acting on the rear wheel is dependent on the current transmission of the drive train, for example the gearshift. Depending on the current transmission, the resulting propulsion of the pushing aid can therefore be significantly too weak or too strong for the current situation. In addition, it is often necessary to limit the maximum speed of the electric bicycle generated by the pushing aid, usually to a maximum of 6 km/h. Control is often based on a speed signal measured at the rear wheel. Especially at such low speeds, speed detection is often inaccurate.

SUMMARY

In contrast, the method according to the disclosure is characterized by the fact that an optimized pushing aid for an electric bicycle can be provided, which can provide a particularly high level of user comfort for a rider of the electric bicycle in a large number of possible pushing situations. In particular, this makes it particularly easy and convenient to provide optimum support at all times during pushing. According to the disclosure, this is achieved by a method for operating a pushing aid of an electric bicycle, wherein the electric bicycle comprises a drive unit for generating propulsion, and a gearshift between the drive unit and a drive wheel of the electric bicycle. The gearshift can be operated electronically. The method comprises the following steps, which are carried out in a pushing aid mode of the electric bicycle:

determining a current transmission ratio of the gearshift,
  operating the drive unit to generate a pushing aid motor torque, and
  controlled adjustment of the transmission ratio of the gearshift depending on the determined current transmission ratio.

The gearshift can be any gearshift that can, for example, provide several different discrete gear transmission ratios, such as a derailleur system with several gears. Alternatively, a gearshift with continuously variable transmission ratios can also be provided, such as a CVT transmission.

The current transmission ratio can be determined, for example, by means of an electronic actuating device of the gearshift, wherein the current transmission ratio can be available as an electronic signal from the actuating device.

In other words, in the method, in particular in response to a start of the pushing aid mode, which is preferably in response to a generated pushing aid signal, which can be generated, for example, by a user input, the current transmission ratio of the gearshift is first determined. In pushing aid mode, the drive unit is also operated to generate a pushing aid motor torque that propels the electric bicycle forward. Depending on the current transmission ratio determined, the transmission ratio of the gearshift is also adjusted in a controlled manner, in particular via the electronic actuating device.

Preferably, the controlled adjustment of the transmission ratio can take place during operation of the drive unit. Alternatively and preferably, the transmission ratio can be adjusted first and, in particular directly afterwards, operation of the drive unit can begin.

The controlled adjustment of the transmission ratio can be regarded in particular as a switching process or "shifting".

The method therefore offers the advantage that the current transmission ratio between the drive unit and the drive wheel of the electric bicycle is taken into account and adjusted in a targeted manner when the pushing aid is operated. The transmission ratio can be adjusted using a variety of factors, for example based on sensor data representing the current pushing situation of the electric bicycle. Alternatively or additionally, a particularly simple method can be provided in which a predefined transmission ratio is always provided that is suitable for a variety of pushing situations. This means that if, for example, the gearshift transmission is particularly small or large before or at the start of pushing aid mode, a suitable transmission for pushing the electric bicycle can be set at the start of pushing aid mode. This provides the user of the electric bicycle with a particularly high level of comfort when pushing the electric bicycle.

Preferred further developments of the disclosure are set forth below.

Preferably, the drive unit is operated in such a way as to provide a constant pushing aid motor torque during the pushing aid mode. This means that the pushing aid motor torque of the drive unit that is directly present at an output of the drive unit is not changed in pushing aid mode, but is always generated at a constant value. This enables particularly simple and efficient pushing aid operation.

It is particularly preferred that the transmission ratio of the gearshift is adjusted in a controlled manner in order to provide a predetermined pushing aid transmission ratio in pushing aid mode. This means that exactly one preferred transmission ratio is defined, namely the pushing aid transmission ratio, which is set automatically in pushing aid mode. This means that the method can be implemented in a particularly simple and cost-effective way.

Preferably, at least two different target transmission ratios are defined. Transmission ratio difference between the determined current transmission ratio and each of the target transmission ratios is determined by the method in each case. The controlled adjustment of the transmission ratio of the gearshift is carried out in such a way as to set the closest target transmission ratio based on the current transmission ratio. This means, for example, that at least two preferred gears are defined for a gearshift with several gears. Based on the determined current gear or transmission ratio, the system shifts to the nearest gear in pushing aid mode. This makes it possible, for example, to change the transmission ratio to a minimum, allowing a transmission ratio that is particularly suitable for pushing operation to be engaged very quickly.

It is also preferable to determine the current speed of the electric bicycle in pushing aid mode. The controlled adjustment of the transmission ratio of the gearshift also takes place depending on the determined current speed of the electric bicycle. For example, the speed of the electric bicycle generated by the propulsion by means of the pushing aid motor torque can be controlled by adjusting the transmission ratio, preferably at constant pushing aid motor torque and/or at constant motor speed. For example, it is possible to control that a predetermined maximum speed of pushing is not exceeded by the controlled adjustment of the transmission ratio. This means that the pushing aid can be optimally adapted to the current movement of the electric bicycle, providing the rider with a particularly high level of comfort.

Preferably, the current speed of the electric bicycle is determined based on the determined current transmission ratio and a current motor speed of the drive unit. This means that the current speed is determined based on the current motor speed and knowledge of the total transmission ratio between the output of the drive unit and the drive wheel of the electric bicycle, which depends on the current transmission ratio of the gearshift. Preferably, the motor speed can be determined by means of a sensor and/or based on controlling the drive unit. This allows the current speed to be determined with particularly high precision and temporal resolution.

Preferably, the controlled adjustment of the transmission ratio of the gearshift is carried out in such a way that, preferably at a predetermined constant motor torque and/or a predetermined constant motor speed, the current speed of the electric bicycle is kept lower than or equal to a predetermined maximum speed of pushing. For example, the maximum speed of pushing can be 6 km/h. This is a simple and reliable way of ensuring, for example, that the pushing aid does not cause the electric bicycle to move faster than a prescribed maximum speed.

It is particularly preferred that the controlled adjustment of the transmission ratio of the gearshift is also carried out based on a determined motor torque of the drive unit. Preferably, the motor torque can be determined by means of a torque sensor, and/or preferably based on controlling the drive unit. Preferably, the controlled adjustment of the transmission ratio is carried out in such a way that the transmission ratio is reduced if the determined current motor torque is greater than or equal to a predetermined target motor torque, particularly preferably if the determined speed is also less than or equal to a predetermined target speed of pushing and/or if the determined speed decreases. In other words, the transmission ratio is reduced if the current transmission ratio is too high for the drive unit to move the electric bicycle efficiently. For example, this can be the case on steep inclines. Alternatively or additionally preferably, the transmission ratio can be increased in the reverse manner if the determined current motor torque is less than a predetermined target motor torque, and/or preferably if the determined speed increases.

In the pushing aid mode, it is also preferable to determine the current incline at which the electric bicycle is located. The controlled adjustment of the transmission ratio of the gearshift is also carried out as a function of the determined current incline, and particularly preferably also based on the weight of the electric bicycle. This enables a particularly efficient and convenient pushing aid function to be provided.

Preferably, a current motor speed is also determined in pushing aid mode, preferably by means of a sensor and/or based on controlling the drive unit. The controlled adjustment of the transmission ratio of the gearshift is carried out in such a way as to keep the motor speed lower than or equal to a predetermined maximum speed, preferably the maximum speed is considered at a predetermined target speed of pushing, which is set in particular in pushing aid mode. In particular, noise emissions from the drive unit can be kept to a minimum, providing a particularly high level of user comfort.

Preferably, a drive wheel torque is also determined in the pushing aid mode based on the determined motor torque of the drive unit and the determined current transmission ratio. The controlled adjustment of the transmission ratio of the gearshift is carried out in such a way that the drive wheel torque is kept within a predetermined torque range. Preferably, the torque range can comprise a range starting from a predetermined target drive wheel torque and a deviation of maximum 5%, preferably maximum 10%. This means that even in changing pushing situations, such as on changing inclines, a constant pushing aid can always be provided, which enables a particularly high level of user comfort for an electric bicycle rider.

Furthermore, the disclosure relates to an electric bicycle which comprises a drive unit, a gearshift which can be operated electronically, and a control unit. The control unit is preferably set up to actuate the drive unit and the gearshift in a controllable manner. Furthermore, the control unit is set up to carry out the described method for operating the pushing aid of the electric bicycle.

BRIEF DESCRIPTION OF THE DRAWINGS

The disclosure is described below based on embodiment examples in connection with the figures. In the figures, functionally identical components are respectively denoted by identical reference numbers. Shown are.

DETAILED DESCRIPTION

Figure 1:
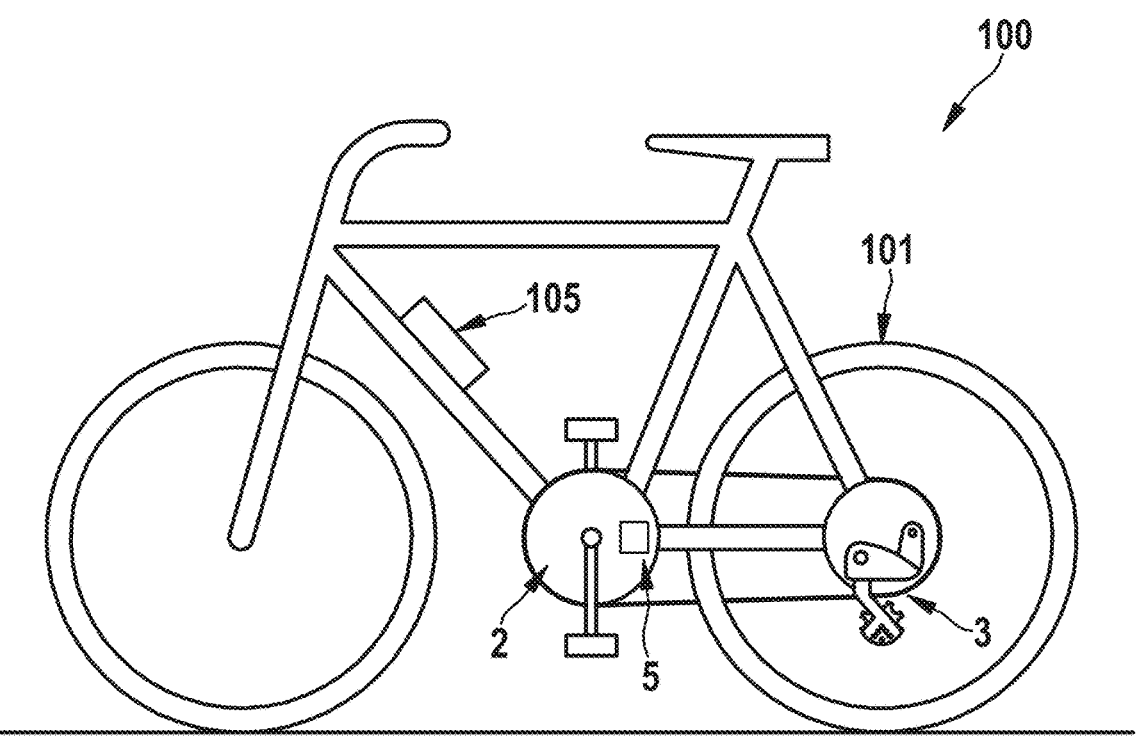
FIG. 1 is a simplified schematic view of an electric bicycle in which a method according to a first embodiment example of the disclosure is carried out, FIG. 2 a simplified schematic view of signal flows when performing the method of the first embodiment example

FIG. 1 shows a simplified schematic view of an electric bicycle 100, which has a drive unit 2 and a gearshift 3. The drive unit 2 is arranged in the area of a bottom bracket of the electric bicycle 100 and comprises a motor, which is in particular an electric motor. The motor can be supplied with electrical energy by means of an electrical energy storage unit 105 of the electric bicycle 100.

A motor torque generated by the drive unit 2 can be used to provide motorized support for the pedal force generated by the muscle power of a rider of the electric bicycle 100.

The gearshift 3 of the electric bicycle 100 is shown schematically in a very simplified form in FIG. 1. In particular, the gearshift 3 comprises at least one gearshift by means of which a transmission ratio in the drive system of the electric bicycle 100, in particular between the drive unit 2 and a drive wheel 101, which is the rear wheel of the electric bicycle 100, can be changed. For example, the gears can be provided as derailleur gears on a rear wheel hub and/or on chain rings, wherein different transmission ratios can be provided in particular by means of different sized sprockets. Alternatively, other types of gears, such as gearboxes or hub gears or gears with continuously variable transmission ratios can also be provided.

The gearshift 3 is electronically operated. This means that a change in the transmission ratio of the gearshift 3 can be initiated by means of an electronic shift signal. Preferably, the gearshift 3 comprises an actuator that is set up to change the transmission ratio in response to receiving a shift signal, for example by moving a rear derailleur. A shift signal can preferably be generated by manual actuation by a rider of the electric bicycle 100.

The electric bicycle 100 also comprises a control unit 5, which is set up to actuate the drive unit 2 and the gearshift 3. Preferably, the control unit 5 can be integrated into the drive unit 2, as shown in simplified schematic form in FIG. 1. The control unit 5 is designed to be able to generate a switching signal. The control unit 5 is also designed to carry out a method for operating a pushing aid of the electric bicycle 100 according to a first embodiment example of the disclosure.

Figure 2:
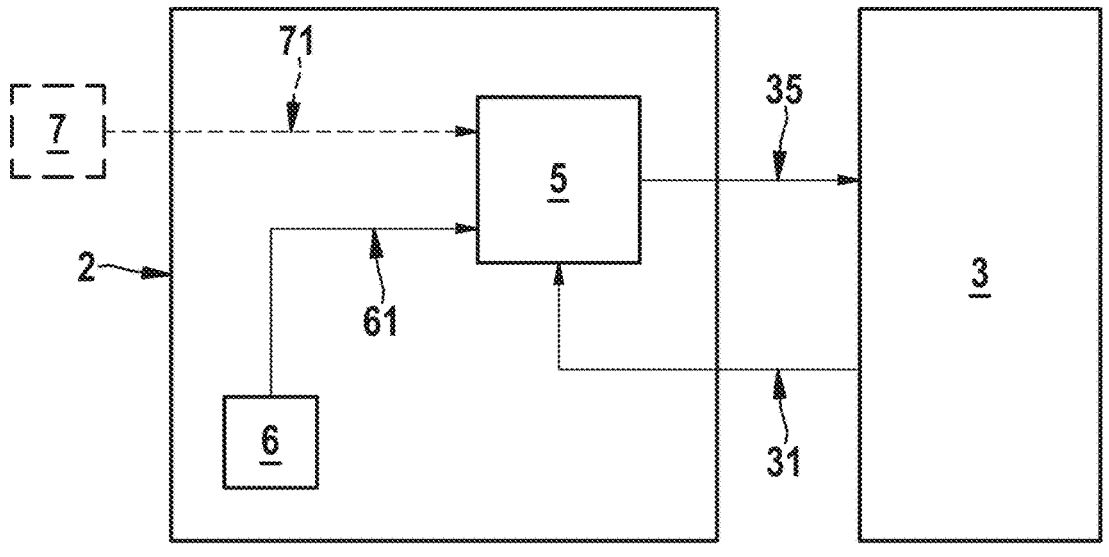
Figure 3:
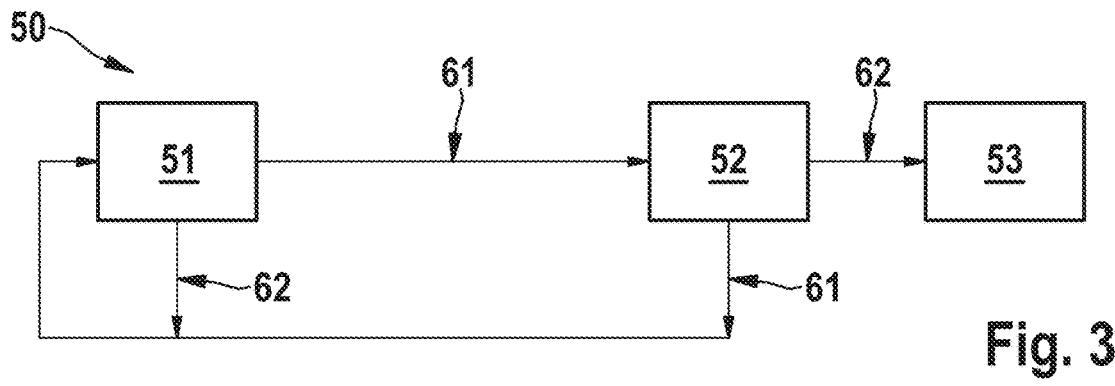
FIG. 3 is a simplified schematic view of a sequence of the method of the first embodiment example.

The method is described in detail below, wherein reference is made to FIGS. 2 and 3. FIG. 2 shows a simplified schematic view of signal flows during the implementation of the method, in particular between the drive unit 5 and the gearshift 3.

In a pushing aid mode of the method, the drive unit 2 is actuated by the control unit 5 in such a way that the drive unit 2 generates a constant pushing aid motor torque. The drive train of the electric bicycle 100, which in particular comprises the gearshift 3, drives the drive wheel 101 of the electric bicycle 100 so that a drive wheel torque is applied to it, which causes propulsion of the electric bicycle 100. This allows the motor torque of the drive unit 2 to be used to support the rider when pushing the electric bicycle 100.

During the method, the transmission ratio of the gearshift 3 is specifically adjusted in the pushing aid mode. For this purpose, the control unit 5 generates a shift signal 35, which is transmitted to the electronic gearshift 3 in order to initiate the change in the transmission ratio.

The shift signal 35 is generated as a function of a determined current transmission ratio of the gearshift 3. The current transmission ratio can be determined by the control unit 5 based on a gear signal 31, which preferably represents the currently engaged gear of the gearshift 3.

In addition, further signals, such as a motor speed signal 61, which is preferably generated by a motor speed sensor 6, and preferably additionally a speed signal 71, which represents a current speed of the electric bicycle 100, can be used in order to carry out the controlled adjustment of the transmission ratio of the gearshift 3 on the basis thereof.

The speed signal 71 can be provided by a speed sensor 7, for example. Alternatively, the speed signal 71 can preferably be provided based on a calculation of the control unit 5, which can be determined based on the determined current transmission ratio of the gearshift 3 and based on the motor speed. This allows the speed of the electric bicycle 100 to be determined with particular precision.

In the first embodiment example of the method, the implementation is particularly simple. The sequence of the method is shown schematically in simplified form in the flow diagram 50 of FIG. 3, which is preferably designed as a decision diagram. The first step 51 is to determine whether the pushing aid mode is active. If this is not the case, no further steps are taken via the negative path 62. If the pushing aid mode is active, the next step 52 follows according to the positive path 61, in which it is determined whether the determined current transmission ratio of the gearshift 3 corresponds to a predetermined pushing aid transmission ratio. If this is not the case, the next step 53 is executed via the negative path 62, in which the gearshift 3 is actuated in such a way that the predetermined pushing aid transmission ratio is changed. If the predetermined pushing aid transmission ratio already exists, no further step is taken according to the positive path 61.

Thus, in the pushing aid mode, while the pushing aid motor torque is being generated by the drive unit 2, it can always be ensured that the gearshift 3 provides the predetermined pushing aid transmission ratio in order to provide suitable push assistance for the rider of the electric bicycle 100 in a variety of pushing situations.

Figure 4:
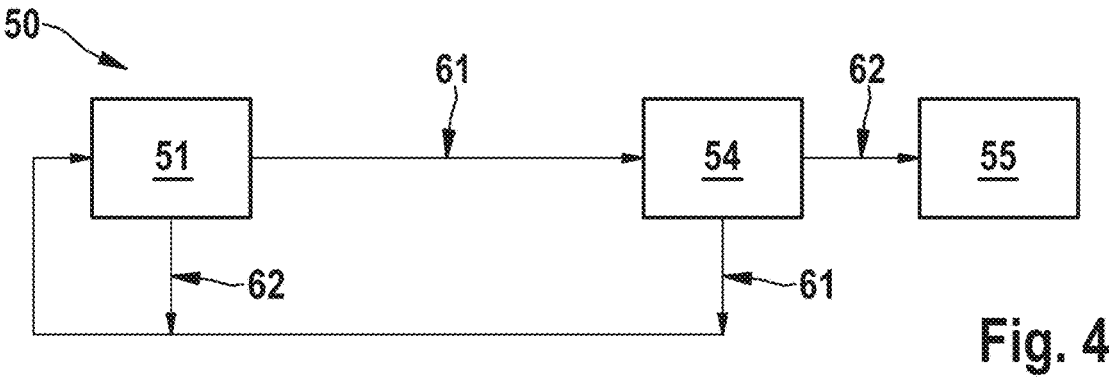
FIG. 4 is a simplified schematic view of a sequence of a method according to a second embodiment example of the disclosure.

FIG. 4 shows a simplified schematic view of a flow chart 50 of a method according to a second embodiment example of the disclosure. The second embodiment example essentially corresponds to the first embodiment example of FIGS. 1 through 3, with the difference that two different target transmission ratios are defined, into which the gearshift 3 can be shifted during the pushing aid mode. In the second step 54 of the method, it is determined whether one of the two predefined target translation ratios is currently present. If this is not the case, according to the path 62, in the next step 55 in each case a transmission ratio difference between the determined current transmission ratio and each of the target transmission ratios is determined. In addition, the transmission ratio of the gearshift 3 is adjusted in a controlled manner in order to set the closest target transmission ratio.

This allows a smaller number of gears to be shifted through in pushing aid mode in order to provide a transmission ratio that is advantageous for the pushing aid. This can also further increase user comfort.

Figure 5:
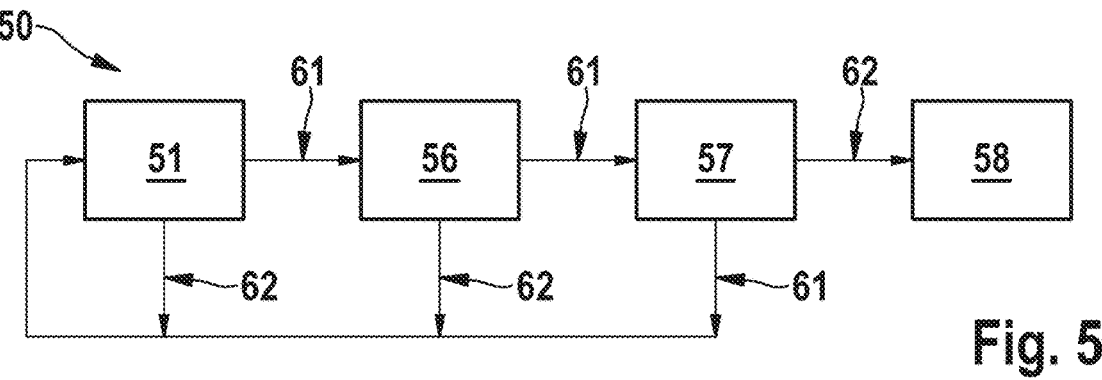
FIG. 5 is a simplified schematic view of a sequence of a method according to a third embodiment example of the disclosure.

FIG. 5 shows a simplified schematic view of a flow chart 50 of a method according to a second embodiment example of the disclosure. The second embodiment example essentially corresponds to the first embodiment example of FIGS. 1 through 3, with the difference that a more flexible adjustment of the transmission ratio can be provided, which is carried out as a function of the motor torque and the speed.

In the second step 56, it is determined whether the current motor torque of the drive unit 2 is greater than or equal to a predetermined target motor torque. Preferably, the target motor torque can be 90% of a maximum available motor torque. If this is the case according to the path 61, the next step 57 determines whether the current speed determined is decreasing. If this is the case, the next step 58 is executed via path 62, in which the transmission ratio of gearshift 3 is reduced. It is preferable to shift to the next lower gear.

This makes it possible to adapt the pushing aid particularly precisely and efficiently to the current pushing situation in order to always reliably provide the rider of the electric bicycle 100 with optimum support when pushing.

What is claimed is:

1. A method for operating a pushing aid of an electric bicycle, wherein the electric bicycle comprises a drive unit configured to generate propulsion and a gearshift between the drive unit and a drive wheel of the electric bicycle, wherein the gearshift is designed to be electronically operable, and wherein the method comprises the following steps which are carried out in a pushing aid mode of the electric bicycle:

determining a current transmission ratio of the gearshift;

operating the drive unit so as to generate a pushing aid motor torque; and controllably adjusting the transmission ratio of the gearshift as a function of the determined current transmission ratio, wherein:

at least two different target transmission ratios are defined, in each case a transmission ratio difference between the determined current transmission ratio and each of the target transmission ratios is determined, and the transmission ratio of the gearshift is adjusted in a controlled manner in order to set the nearest target transmission ratio.

2. The method according to claim 1, wherein the drive unit is operated to provide a constant pushing aid motor torque during the pushing aid mode.

3. The method according to claim 1, wherein the transmission ratio of the gearshift is adjusted in a controlled manner to provide a predetermined pushing aid transmission ratio.

4. The method according to claim 1, wherein:

in the pushing aid mode, a current speed of the electric bicycle is additionally determined, and the controlled adjustment of the transmission ratio of the gearshift is additionally carried out as a function of the determined current speed.

5. The method according to claim 4, wherein the current speed is determined based on the determined current transmission ratio and a current motor speed of the drive unit.

6. The method according to claim 4, wherein the controlled adjustment of the transmission ratio of the gearshift is carried out in such a way that the current speed of the electric bicycle is kept lower than or equal to a predetermined maximum speed of pushing.

7. The method according to claim 1, wherein the controlled adjustment of the transmission ratio of the gearshift is additionally performed based on a determined motor torque of the drive unit such that the transmission ratio is reduced if the determined current motor torque is greater than or equal to a predetermined target motor torque.

8. The method according to claim 1, wherein:

a current incline is also determined in the pushing aid mode, and the controlled adjustment of the transmission ratio of the gearshift additionally takes place as a function of the determined current incline.

9. The method according to claim 8, wherein:

the controlled adjustment of the transmission ratio of the gearshift additionally takes place based on a weight of the electric bicycle.

10. The method according to claim 1, wherein:

in the pushing aid mode, a current motor speed is additionally determined, and the controlled adjustment of the transmission ratio of the gearshift is carried out in such a way as to keep the motor speed lower than or equal to a predetermined maximum speed.

11. The method according to claim 1, wherein:

in the pushing aid mode, there is additionally a determination of a drive wheel moment based on the determined motor torque of the power unit and the determined current transmission ratio, and the controlled adjustment of the transmission ratio of the gearshift is carried out in such a way that the drive wheel torque is kept within a predetermined torque range.

12. An electric bicycle, comprising:

a drive unit;

a gearshift which is designed to be electronically actuated; and a control unit which is set up to carry out the method according to claim 1.

13. The method according to claim 1, wherein the controlled adjustment of the transmission ratio of the gearshift is additionally performed based on a determined motor torque of the drive unit such that the transmission ratio is reduced if the determined current motor torque is greater than or equal to a predetermined target motor torque, and if additionally a determined speed is less than or equal to a predetermined target speed of pushing and/or if the determined speed decreases.

14. The method according to claim 1, wherein:

in the pushing aid mode, a current motor speed is additionally determined, and the controlled adjustment of the transmission ratio of the gearshift is carried out in such a way as to keep the motor speed at a predetermined target speed of pushing.

15. A method for operating a pushing aid of an electric bicycle, wherein the electric bicycle comprises a drive unit configured to generate propulsion and a gearshift between the drive unit and a drive wheel of the electric bicycle, wherein the gearshift is designed to be electronically operable, and wherein the method comprises the following steps which are carried out in a pushing aid mode of the electric bicycle:

determining a current transmission ratio of the gearshift;

operating the drive unit so as to generate a pushing aid motor torque; and controllably adjusting the transmission ratio of the gearshift as a function of the determined current transmission ratio, wherein a current incline is also determined in the pushing aid mode, and the controlled adjustment of the transmission ratio of the gearshift additionally takes place as a function of the determined current incline.

16. A method for operating a pushing aid of an electric bicycle, wherein the electric bicycle comprises a drive unit configured to generate propulsion and a gearshift between the drive unit and a drive wheel of the electric bicycle, wherein the gearshift is designed to be electronically operable, and wherein the method comprises the following steps which are carried out in a pushing aid mode of the electric bicycle:

determining a current transmission ratio of the gearshift;

operating the drive unit so as to generate a pushing aid motor torque; and controllably adjusting the transmission ratio of the gearshift as a function of the determined current transmission ratio, wherein a current incline is also determined in the pushing aid mode, and the controlled adjustment of the transmission ratio of the gearshift additionally takes place as a function of the determined current incline, and additionally based on a weight of the electric bicycle.

* * * * *